(12) United States Patent  
Mulligan et al.

(10) Patent No.: US 12,555,689 B2  
(45) Date of Patent: Feb. 17, 2026

(54) GENERATING POTENTIAL BARRIERS TO A STRUCTURED PROCESS

(71) Applicant: International Business Machines Corporation, Armonk, NY (US)

(72) Inventors: Natalia Mulligan, Dublin (IE); Marco Luca Sbodio, Dublin (IE); Joao H. Bettencourt-Silva, Dublin (IE); Vanessa Lopez Garcia, Dublin (IE); Gabriele Picco, Dublin (IE); Marcos Martínez Galindo, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 18/452,417

(22) Filed: Aug. 18, 2023

(65) Prior Publication Data

US 2025/0062036 A1    Feb. 20, 2025

(51) Int. Cl.
  *G06Q 10/0631* (2023.01)
  *G16H 10/20* (2018.01)
  *G16H 50/70* (2018.01)

(52) U.S. Cl.
  CPC ....... *G16H 50/70* (2018.01); *G06Q 10/06315* (2013.01); *G16H 10/20* (2018.01)

(58) Field of Classification Search
  CPC ... G06Q 10/06315; G06H 50/70; G06H 10/20
  See application file for complete search history.

(56) References Cited

U.S. PATENT DOCUMENTS

| 11,328,796 B1 | 5/2022 | Jain et al. |
| 11,615,799 B2 * | 3/2023 | Zhu ........................ G06F 16/345 |
| | | 704/235 |
| 12,450,284 B2 * | 10/2025 | McCarson ............. G06N 20/10 |
| 2019/0214114 A1 * | 7/2019 | Schleyer ................ G06Q 50/22 |

(Continued)

FOREIGN PATENT DOCUMENTS

WO   WO-2010109351 A1 *  9/2010  .......... G06F 19/321  
WO   WO-2023275574 A1 *  1/2023

OTHER PUBLICATIONS

Nipp, R.D., et al., "Overcoming Barriers to Clinical Trial Enrollment", American Society of Clinical Oncology Educational Book 39, May 17, 2019, p. 105-114, United States (Year: 2019).*

(Continued)

*Primary Examiner* — Dylan C White  
(74) *Attorney, Agent, or Firm* — Gavin Giraud

(57) ABSTRACT

One embodiment of the invention provides a method for generating and ranking potential barriers that prevent completion of a structured process. The method comprises receiving a textual description of the structured process, receiving one or more templates relating to the structured process, and identifying a set of user actions required to complete the structured process based on the textual description. The method further comprises expanding the set of user actions based on general knowledge to include one or more additional actions, and updating the one or more templates based on the expanded set of user actions. The method further comprises generating, using at least one generative language model, a set of potential barriers that prevent completion of the structured process based on the one or more updated templates.

20 Claims, 4 Drawing Sheets

(56) References Cited

U.S. PATENT DOCUMENTS

| | | | |
|---|---|---|---|
| 2020/0411199 A1 | 12/2020 | Shrager et al. | |
| 2021/0241403 A1* | 8/2021 | DeBiase | G06Q 90/00 |
| 2022/0310216 A1 | 9/2022 | Walpole et al. | |
| 2024/0249229 A1* | 7/2024 | Rao | G06Q 10/06393 |
| 2024/0428356 A1* | 12/2024 | DeBiase | G06Q 50/186 |
| 2025/0061526 A1* | 2/2025 | Davis | G06Q 10/101 |

OTHER PUBLICATIONS

Adesoye, T., et al., "Meeting Trial Participants Where They Are: Decentralized Clinical Trials as a Patient-Centered Paradigm for Enhancing Accrual and Diversity in Surgical and Multidisciplinary Trials in Oncology", American Society of Clinical Oncology, Feb. 23, 2023, p. 1-6, United States.

Heller, C., et al., "Strategies Addressing Barriers to Clinical Trial Enrollment of Underrepresented Populations: a Systematic Review", National Library of Medicine, Aug. 15, 2014, pp. 1-23, HHS, United States.

Chalela, P., et al., "Promoting Factors and Barriers to Participation in Early Phase Clinical Trials: Patients Perspectives", National Library of Medicine, Apr. 24, 2014, pp. 1-20, NIH, United States.

Rodriguez-Torres, E., et al., "Barriers and facilitators to the participation of subjects in clinical trials: An overview of reviews", Contemporary Clinical Trials Communications, Aug. 3, 2021, pp. 1-18, v. 23, Elsevier Inc., The Netherlands.

Wong, A.R., et al., "Barriers to Participation in Therapeutic Clinical Trials as Perceived by Community Oncologists", JCO Oncology Practice, Apr. 2, 2020, pp. e848-e858, v. 19, issue 9, American Society of Clinical Oncology, United States.

Narola, J., "Applying the Agile Mechanism in the Clinical Trails Domain for Drug Development", Dissertations and Theses, Harrisburg University of Science and Technology, Aug. 12, 2018, pp. 1-47, United States.

Brown, C.H., et al., "Adaptive designs for randomized trials in public health", Annu Rev Public Health, Apr. 29, 2009, p. 1-25, NIH Public Access, United States.

Nipp, R.D., et al., "Overcoming Barriers to Clinical Trial Enrollment", American Society of Clinical Oncology Educational Book 39, May 17, 2019, p. 105-114, United States.

Weissler, E.H., et al., "The role of machine learning in clinical research: transforming the future of evidence generation", Aug. 16, 2021, pp. 1-15, Article No. 537, United States.

Gligorijevic, J., et al., "Optimizing clinical trials recruitment via deep learning", Journal Am Med Inform Assoc., Jun. 12, 2019, pp. 1195-1202, National Library of Medicine, v.26(11), Oxford University Press, United States.

Elkin, M.E., et al., "Predictive modeling of clinical trial terminations using feature engineering and embedding learning", Scientific Reports, Feb. 10, 2021, pp. 1-12, vol. 11, Article No. 3446, United States.

Deng et al., "RLPROMPT: Optimizing Discrete Text Prompts with Reinforcement Learning", Retrieved from: https://arxiv.org/pdf/2205.12548, Oct. 22, 2022, 23 pages.

Devlin et al., "BERT: Pre-training of Deep Bidirectional Transformers for Language Understanding", Retrieved from: https://arxiv.org/pdf/1810.04805, May 24, 2019, 16 pages.

Hou et al., "MetaPrompting: Learning to Learn Better Prompts", Retrieved from: https://aclanthology.org/2022.coling-1.287.pdf, Feb. 3, 2023, 12 pages.

Lewis et al., "BART: Denoising Sequence-to-Sequence Pre-training for Natural Language Generation, Translation, and Comprehension", Retrieved from: https://arxiv.org/pdf/1910.13461, Oct. 29, 2019, 10 pages.

Raffel et al., "Exploring the Limits of Transfer Learning with a Unified Text-to-Text Transformer", Journal of Machine Learning Research 21, 2020, pp. 1-67.

Sriram, "Writing a Clinical Trial Protocol: Expert Tips", Retrieved from: https://www.kolabtree.com/blog/how-to-write-a-clinical-trial-protocol/, Mar. 23, 2020, 8 pages.

Unknown, "IBM Watson Discovery", Retrieved from: https://web.archive.org/web/20220104024026/https://www.ibm.com/cloud/watson-discovery, Retrieved on: Jan. 4, 2022, 6 pages.

Unknown, "Industrial-Strength Natural Language Processing in Python", Retrieved from: https://web.archive.org/web/20210117143823/https://spacy.io/, Retrieved on: Jan. 17, 2021, 8 pages.

Unknown, "Prompt engineering", Retrieved from: https://web.archive.org/web/20220326133956/https://en.wikipedia.org/wiki/Prompt_engineering, Retrieved on: Mar. 26, 2022, 2 pages.

Unknown, "Stress in Crohn's Disease", Retrieved from: https://clinicaltrials.gov/study/NCT04809194, Jan. 5, 2023, 10 pages.

Xue et al., "Fine-tuning BERT for Joint Entity and Relation Extraction in Chinese Medical Text", Retrieved from: https://arxiv.org/pdf/1908.07721, Oct. 22, 2019, 6 pages.

\* cited by examiner

GENERATING POTENTIAL BARRIERS TO A STRUCTURED PROCESS

BACKGROUND

Embodiments of the invention generally relate to structured processes, and more specifically, generating a ranked list of potential barriers that prevent completion of a structured process.

Any human-related structured process or activity that aims at achieving a desired outcome requires a definition of the outcome, a definition of one or more participants enrolled or participating in the process, and a definition of user actions that the participants must perform to achieve the outcome. A number of obstacles or barriers may exist that limit the actions and, in turn, limit or prevent achieving the desired outcome.

SUMMARY

One embodiment of the invention provides a method for generating and ranking potential barriers that prevent completion of a structured process. The method comprises receiving a textual description of the structured process, receiving one or more templates relating to the structured process, and identifying a set of user actions required to complete the structured process based on the textual description. The method further comprises expanding the set of user actions based on general knowledge to include one or more additional actions, and updating the one or more templates based on the expanded set of user actions. The method further comprises generating, using at least one generative language model, a set of potential barriers that prevent completion of the structured process based on the one or more updated templates. Other embodiments include a system for generating and ranking potential barriers that prevent completion of a structured process, and a computer program product for generating and ranking potential barriers that prevent completion of a structured process. These features contribute to the advantage of a generative artificial intelligence (AI) solution for automatically generating and ranking potential barriers, thereby reducing or removing the need to manually identify potential barriers based on domain expert knowledge, which is limited and expensive.

One or more of the following features may be included.

In some embodiments, for each potential barrier, a corresponding confidence score is determined using a learned probability distribution of the at least one generative language model, the set of potential barriers is ranked based on each confidence score corresponding to each potential barrier, and a ranked list based on the ranking is provided as output.

In some embodiments, user feedback on the ranked list is received, and the at least one generative language model is fine-tuned based on the user feedback.

In some embodiments, the textual description describes the set of user actions that one or more participants enrolled or participating in the structured process are required to perform to complete the structured process.

In some embodiments, the set of user actions is identified by applying natural language processing (NLP) to the textual description.

In some embodiments, the general knowledge comprises at least one of knowledge graphs and deep learning question answering and information retrieval models.

In some embodiments, the one or more additional user actions are required to complete the set of user actions.

In some embodiments, the one or more templates are updated by filling in one or more fields of the one or more templates based on the expanded set of user actions.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

Figure 1:
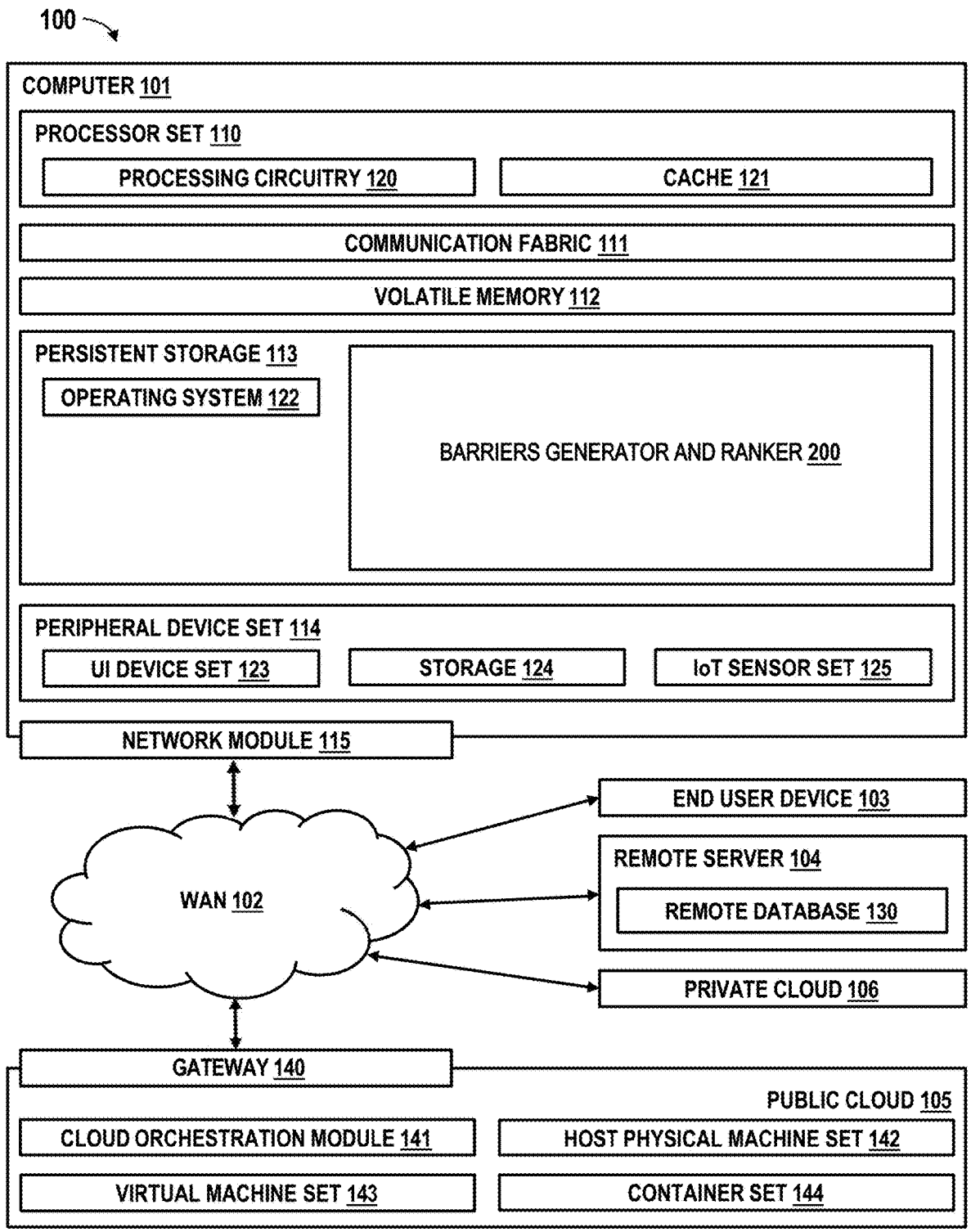
FIG. 1 depicts a computing environment according to an embodiment of the present invention.

The detailed description explains the preferred embodiments of the invention, together with advantages and features, by way of example with reference to the drawings.

DETAILED DESCRIPTION

Embodiments of the invention generally relate to structured processes, and more specifically, generating a ranked list of potential barriers that prevent completion of a structured process. One embodiment of the invention provides a method for generating and ranking potential barriers that prevent completion of a structured process. The method comprises receiving a textual description of the structured process, receiving one or more templates relating to the structured process, and identifying a set of user actions required to complete the structured process based on the textual description. The method further comprises expanding the set of user actions based on general knowledge to include one or more additional actions, and updating the one or more templates based on the expanded set of user actions. The method further comprises generating, using at least one generative language model, a set of potential barriers that prevent completion of the structured process based on the one or more updated templates. These features contribute to the advantage of a generative artificial intelligence (AI) solution for automatically generating and ranking potential barriers, thereby reducing or removing the need to manually identify potential barriers based on domain expert knowledge, which is limited and expensive.

Another embodiment of the invention provides a system for generating and ranking potential barriers that prevent completion of a structured process. The system comprises at least one processor and a processor-readable memory device storing instructions that when executed by the at least one processor causes the at least one processor to perform operations. The operations include receiving a textual description of the structured process, receiving one or more templates relating to the structured process, and identifying a set of user actions required to complete the structured process based on the textual description. The operations further include expanding the set of user actions based on general knowledge to include one or more additional actions, and updating the one or more templates based on the expanded set of user actions. The operations further include generating, using at least one generative language model, a set of potential barriers that prevent completion of the structured process based on the one or more updated templates.

One embodiment of the invention provides a computer program product for generating and ranking potential barriers that prevent completion of a structured process. The computer program product comprises a computer readable storage medium having program instructions embodied therewith. The program instructions are executable by a processor to cause the processor to receive a textual description of the structured process, receive one or more templates relating to the structured process, and identify a set of user actions required to complete the structured process based on the textual description. The program instructions are executable by the processor to further cause the processor to expand the set of user actions based on general knowledge to include one or more additional actions, and update the one or more templates based on the expanded set of user actions. The program instructions are executable by the processor to further cause the processor to generate, using at least one generative language model, a set of potential barriers that prevent completion of the structured process based on the one or more updated templates.

In some embodiments, for each potential barrier, a corresponding confidence score is determined using a learned probability distribution of the at least one generative language model, the set of potential barriers is ranked based on each confidence score corresponding to each potential barrier, and a ranked list based on the ranking is provided as output.

In some embodiments, user feedback on the ranked list is received, and the at least one generative language model is fine-tuned based on the user feedback.

In some embodiments, the textual description describes the set of user actions that one or more participants enrolled or participating in the structured process are required to perform to complete the structured process.

In some embodiments, the set of user actions is identified by applying natural language processing (NLP) to the textual description.

In some embodiments, the general knowledge comprises at least one of knowledge graphs and deep learning question answering and information retrieval models.

In some embodiments, the one or more additional user actions are required to complete the set of user actions.

In some embodiments, the one or more templates are updated by filling in one or more fields of the one or more templates based on the expanded set of user actions.

At present, human-related potential barriers that limit user actions required to achieve a desired outcome are manually identified based on domain expert knowledge, which is limited and expensive. There are no existing automated solutions for generating and ranking potential barriers that may prevent completion of user actions required in a structured process based on a textual description of the process.

One or more embodiments of the invention provide a framework for generating a ranked list of potential barriers that prevent completion of a structured process. The framework provides a generative AI solution for automatically generating and ranking potential barriers, thereby reducing or removing the need to manually identify potential barriers based on domain expert knowledge, which is limited and expensive.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment 100 according to an embodiment of the present invention. Computing environment 100 contains an example of an environment for the execution of at least some of the computer code involved in performing the inventive methods, such as a barriers generator and ranker code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
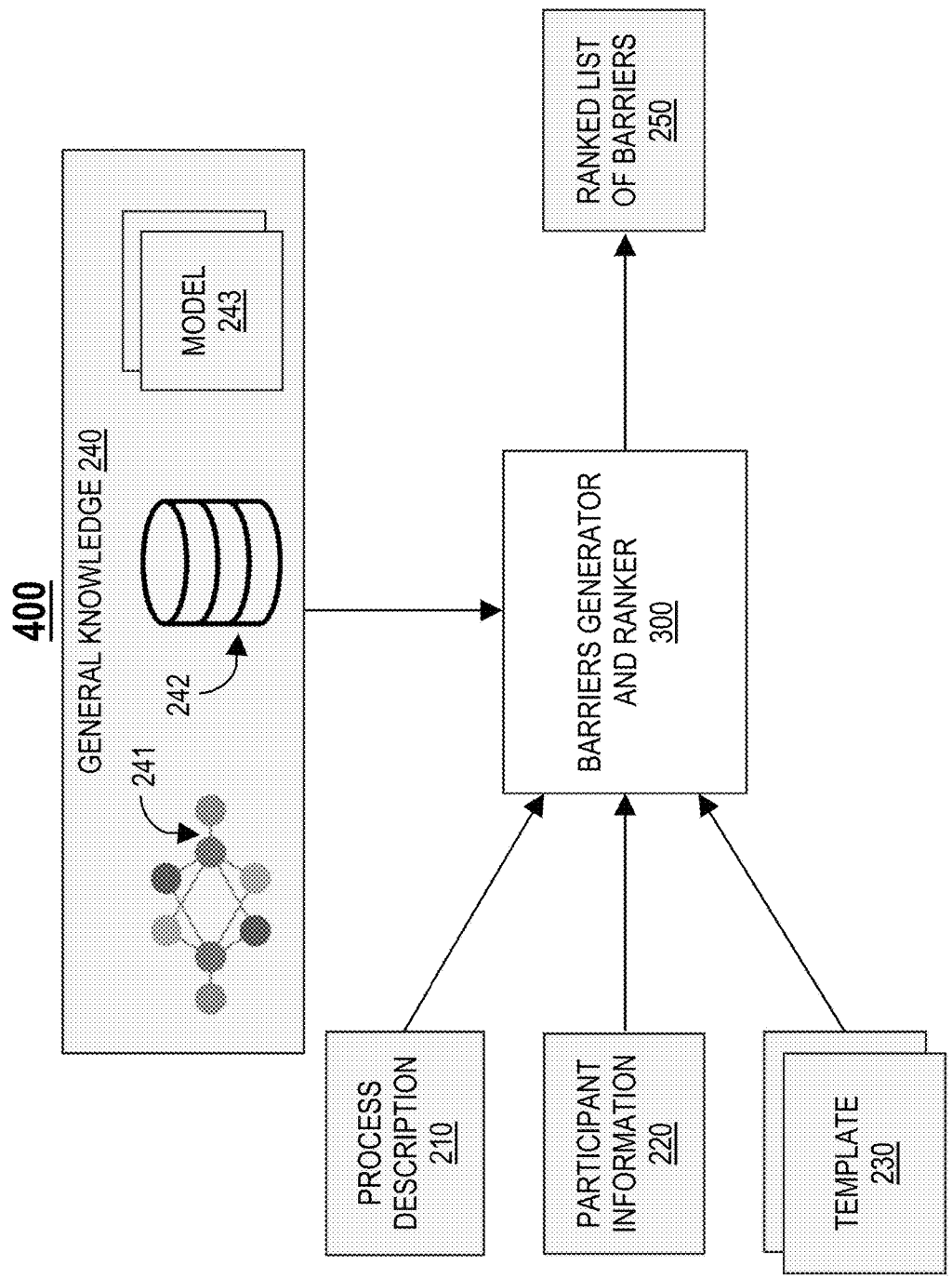
FIG. 2 illustrates an example barriers generator and ranker system, in accordance with an embodiment of the invention.

FIG. 2 illustrates an example barriers generator and ranker system 300, in accordance with an embodiment of the invention. The system 300 provides a generative AI solution for automatically generating and ranking potential barriers that may prevent completion of user actions required in a structured process based on a textual description of the process. The textual description defines the user actions and one or more participants enrolled or participating in the process. In some embodiments, the system 300 is representative of the block 200 shown in FIG. 1.

For example, a clinical trial is an example structured process defined by one or more domain experts who need to study the effectiveness of a particular intervention (e.g., a drug, a procedure, etc.). A clinical trial protocol is a documentation of a plan developed by one or more domain experts for executing a clinical trial. The clinical trial protocol will include a textual description of the clinical trial, including activities that participants enrolled in the clinical trial will have to undertake.

In some embodiments, the system 300 is configured to receive, as input, a process description 210 for a structured process. A process description 210 for a structured process is a textual description of the process that describes one or more user actions that a person or a group of people with shared characteristics (i.e., one or more participants enrolled or participating in the process) must perform in order to successfully complete the process and achieve a desired outcome.

Participant information 220 for a structured process identifies one or more participants enrolled or participating in the process. In some embodiments, the system 300 is configured to extract participant information 220 for a structured process from a process description 210 for the process. In some embodiments, the system 300 is configured to further receive, as input, participant information 220 for a structured process, wherein the participant information 220 and a process description 210 for the process are different and separate inputs. In some embodiments, participant information 220 received as input is supplemented with information extracted from a process description 210.

In some embodiments, the system 300 is configured to further receive, as input, one or more templates 230 for a structured process, wherein the templates 230 are manually created, configurable, and extendable. Each template 230 is a form used as a guide to explain why a user action required in the process could not be completed. For example, in some embodiments, each template 230 comprises at least one sentence including one or more fields to be completed or filled in by the system 300, wherein the sentence provides a template for explaining why a user action required in the process could not be completed. As described in detail later herein, in some embodiments, the system 300 automatically improves and/or extracts prompts from the templates 230.

For example, if a structured process is a clinical trial, a process description 210 for the clinical trial is a clinical trial protocol describing user actions that cohorts (i.e., participants) enrolled in the clinical trial must perform, a participant information 220 for the clinical trial identifies the cohorts, and each template 230 for the clinical trial is a form used as a guide to explain why a user action could not be performed by a cohort.

Each input received by the system 300 may be in the form of structured data or unstructured data. In some embodiments, if an input received is in the form of unstructured data, the system 300 extracts information (e.g., participant information 220) from the input using one or more NLP methods, such as named entity recognition models.

In some embodiments, the system 300 is configured to receive or obtain, as input, general knowledge 240 (or data sources) relating to a structured process. Examples of general knowledge 240 include, but are not limited to, one or more knowledge graphs 241, one or more databases 242 (or data sources), one or more models 243 (e.g., deep learning question answering and information retrieval models), etc.

In some embodiments, the system 300 is configured to: (1) identify one or more user actions defined in a process description 210 for a structured process, (2) enrich or expand the user actions using general knowledge 240, (3) generate one or more potential barriers that may prevent completion of the user actions, and (4) rank the potential barriers based on how best the potential barriers match one or more participants enrolled or participating in the process, resulting in a ranked list 250 of potential barriers provided as output. For example, if the participants are adults of a particular age, the potential barriers most likely to affect such adults are ranked higher in the ranked list 250.

Examples of user actions required in a structured process include, but are not limited to, to get an intravenous infusion, to get an X-Ray, to follow a particular diet, to get a MRI, etc. For example, if a required user action is to get an X-Ray, general knowledge that an X-Ray requires a visit to a radiology department or unit in a hospital may be used to enrich or expand this action, and a potential barrier may be that there is no transportation to the hospital.

For example, assume a structured process is a clinical trial, and a clinical trial protocol for the clinical trial includes the following example textual description: "A Study to Evaluate Adverse Events and Change in Disease Activity in Participants Between 18 to 75 Years of Age Treated With Intravenous (IV) Infusion and Subcutaneous (SC) Injections of ABBV-154 for Moderately to Severely Active Crohn's Disease (AIM-CD)". Participant information 220 for the clinical trial may be extracted from the clinical trial protocol and/or provided as input. For example, if the participant information 220 is extracted from the clinical trial protocol, cohorts enrolled in the clinical trial have the following shared characteristics: between 18 to 75 years of age with moderately to severely active Crohn's Disease. For example, if the participant information 220 is provided as input, the cohorts enrolled in the clinical trial have the following shared characteristics: adults, gender A, race B, living alone, etc. User actions defined in the clinical trial protocol include the following: each cohort to get an IV infusion, and each cohort to get SC injections of ABBV-154. A template 230 for the clinical trial may include the following example sentence: "<Gender, e.g., gender A> <Stage of life, e.g., age group C> had to <action> but couldn't do it because . . . ".

Figure 3:
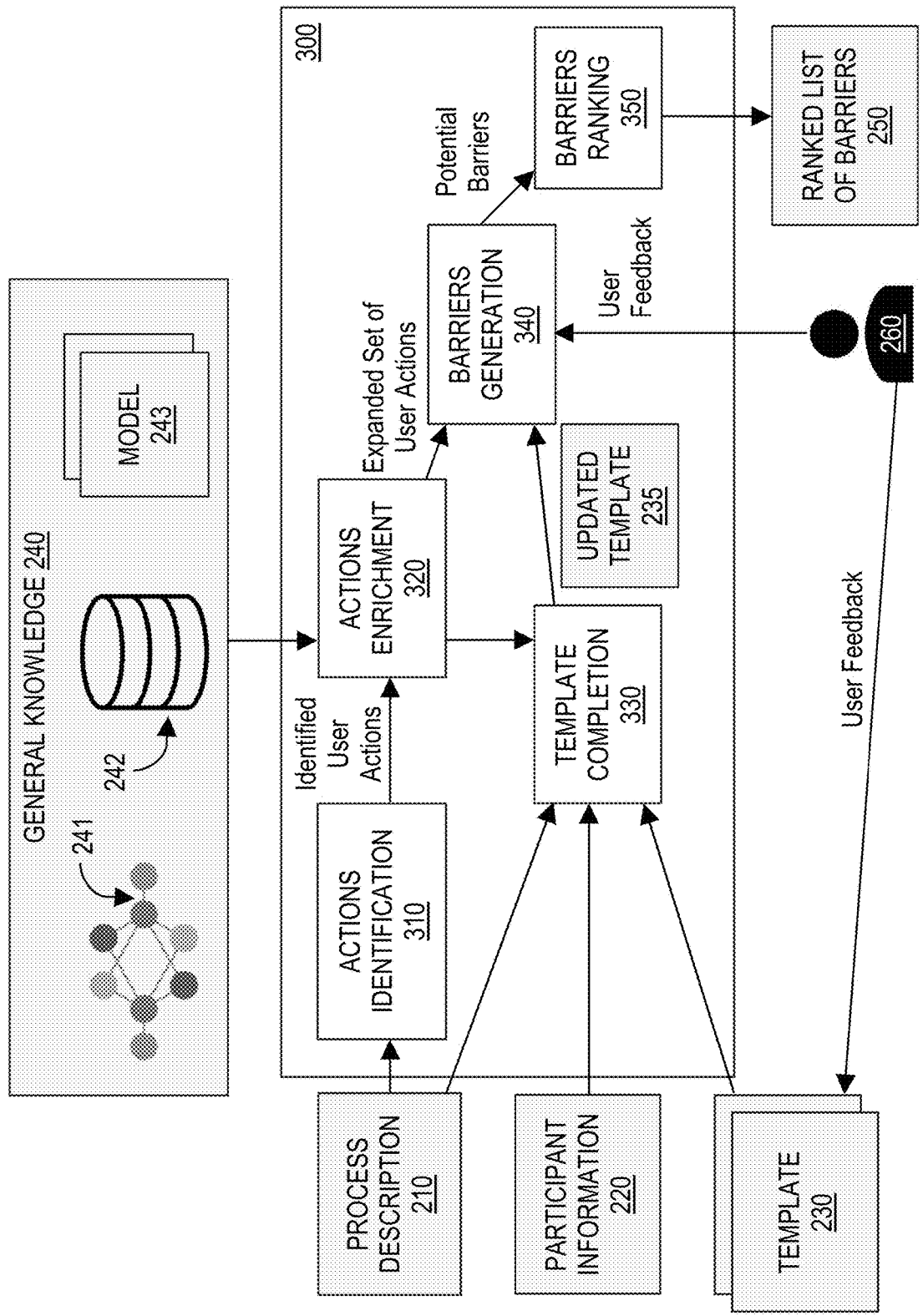
FIG. 3 illustrates the example barriers generator and ranker system in detail, in accordance with an embodiment of the invention.

FIG. 3 illustrates the example barriers generator and ranker system 300 in detail, in accordance with an embodiment of the invention. In some embodiments, the system 300 includes an actions identification unit 310 configured to: (1) receive a process description 210 for a structured process, and (2) identify, based on the process description 210, one or more user actions required of one or more participants enrolled or participating in the process. The participants must perform the identified user actions to complete the process and achieve a desired outcome. Each identified user action is explicitly referenced in the process description 210.

The actions identification unit 310 identifies user actions using one or more NLP methods. For example, in some embodiments, the actions identification unit 310 extracts one or more user actions from a process description 210 using one or more machine learning models for token classification, wherein the machine learning models are trained over a dataset of labelled user actions.

Part-of-speech (POS) tagging is a process in NLP where each word in a text is labeled with its corresponding part of speech, such as nouns, verbs, adjectives, and other grammatical categories.

As another example, in some embodiments, the actions identification unit 310 detects one or more user actions in a process description 210 using linguistics. For example, the actions identification unit 310 may detect in a process description 210 verbs, passive verbs related to participants, and other words that typically signal events and actions. Specifically, in some embodiments, the actions identification unit 310: (1) detects participants in the process description 210 using one or more pre-trained and/or fine-tuned named entity recognition models (e.g., the Bidirectional Encoder Representations from Transformers (BERT) language representation model), (2) detects verbs in the process description 210 using one or more pre-trained and/or fine-tuned POS tagging models (e.g., BERT or the open-source software library spaCy®), and (3) detects relationships in the process description 210 using one or more pre-trained and/or fine-tuned parsing models (e.g., spaCy®) and one or more pre-trained relation extraction models (e.g., BERT).

As yet another example, in some embodiments, the actions identification unit 310 extracts one or more user actions from a process description 210 using available general knowledge 240. Examples of general knowledge 240 include, but are not limited to, a database 242 providing a thesaurus of user actions, a knowledge graph with possible user actions, etc.

In some embodiments, a combination of one or more of the NLP methods described above are used to improve performance of the system 300.

In some embodiments, the system 300 includes an actions enrichment unit 320 configured to: (1) receive one or more identified user actions for a structured process (e.g., from the actions identification unit 310), (2) receive/obtain general knowledge 240 related to the process, and (3) enrich or expand the identified user actions based on the general knowledge 240, resulting in an expanded set of user actions for the process that includes the identified user actions and one or more implicit user actions. Each implicit user action represents an additional user action that is required to complete or perform an identified user action, wherein the implicit user action is not explicitly referenced in a process description 210.

For example, some identified user actions are domain specific user actions that may be too high-level and/or composite. The actions enrichment unit 320 may enrich or expand such domain specific user actions with implicit user actions that represent additional steps that a participant must undertake in order to complete or perform the domain specific user actions.

The actions enrichment unit 320 enriches or expands identified user actions using one or more methods. For example, in some embodiments, the actions enrichment unit 320 enriches or expands identified user actions using knowledge graphs 241 that are both general knowledge and domain specific. As another example, in some embodiments, the actions enrichment unit 320 enriches or expands identified user actions using one or more deep learning question answering and information retrieval models (e.g., IBM Watson® Discovery). For example, if an identified user action is for a participant to get a MRI, the actions enrichment unit 320 may query a deep learning question answering and information retrieval model to determine how to get a MRI. Based on the response of the model, the actions enrichment unit 320 enriches or expands the identified user action with an implicit user action, such as to go to a hospital that can do MRIs.

In some embodiments, the system 300 includes a templates completion unit 330 configured to: (1) receive an expanded set of user actions for a structured process (e.g., from the actions enrichment unit 320), (2) receive participant information 220 identifying one or more participants or one or more groups of participants enrolled or participating in the process, (3) receive one or more templates 230 for the process, and (4) update the templates 230 by completing or filling in the templates 230 based on the user actions and the participant information 220, resulting in one or more updated templates 235 for the process. In some embodiments, the templates completion unit 330 completes or fills each template 230 for each user action and each participant or group of participants.

For example, in some embodiments, the templates completion unit 330 completes or fills the templates 230 using one or more implicit user actions included in the expanded set of user actions. For example, assume a template 230 comprises, in part, the following text: "<Gender, e.g., gender A> <Stage of life, e.g., age group C> had to <action> but couldn't do it because . . . ", where the <action> field represents an implicit user action to be completed or filled. If an identified user action is to get a MRI and an implicit user action required to complete the identified user action is to go to a hospital, the templates completion unit 330 completes or fills the <action> field of the template 230 based on the implicit user action. The resulting updated template 235 comprises, in part, the following text: "<Gender, e.g., gender A> <Stage of life, e.g., age group C> had to go to the hospital but couldn't do it because . . . ". Therefore, the templates completion unit 330 automatically improves the template 230 by updating the template 230 to the updated template 235.

In some embodiments, a number of templates 230 completed or filled by the templates completion unit 330 varies. For example, in some embodiments, each template 230 received is completed or filled by the templates completion unit 330. As another example, in some embodiments, only a subset of all templates 230 received are completed or filled by the templates completion unit 330, wherein the subset includes one or more of the most relevant templates 230. In some embodiments, the most relevant templates 230 are detected based on similarities between text of the templates 230 and the user actions.

A language model is a probability distribution over sequences of words. Prompt engineering or in-context learning is an ability of a large language model's size, that allows, from a user's standpoint, crafting, priming, refining, or probing (series of) prompts within the bounded scope of a single conversation. A large language model is software that can produce plausible text, images or code in response to simple prompts.

In some embodiments, the system 300 includes a barriers generation unit 340 configured to: (1) receive one or more updated templates 235 for a structured process (e.g., from the template completion unit 330), and (2) generate, using one or more generative language models, one or more contextually likely potential barriers based on the updated templates 235, wherein the potential barriers may prevent completion of user actions required in the process. The language models receive the updated templates 235 as inputs, and provide future predictions of the potential barriers as outputs.

The barriers generation unit 340 uses each updated template 235 to exploit a learned probability distribution of a language model in a prompt engineering manner. Specifically, the barriers generation unit 340 automatically extracts prompts from the updated templates 235.

In some embodiments, each updated template 235 comprises, in part, a < . . . > field representing a potential barrier to be completed or filled. For example, an updated template 235 may comprise, in part, text such as "Gender A age group C can't go to the hospital because < . . . >" or "< . . . > is preventing age group C living alone to make their weekly blood test", wherein the < . . . > field may be completed or filled with a contextually likely potential barrier generated by the barriers generation unit 340.

In some embodiments, based on the potential barriers, the barriers generation unit 340 provides one or more potential complete sentences. Each sentence is originally obtained from an updated template 235 and includes a completed of filled in < . . . > field that describes a potential barrier (i.e., one of the potential barriers) that may prevent completion of a user action.

In some embodiments, the barriers generation unit 340 uses a pre-trained Sequence-to-Sequence (Seq2Seq) language model to extract general knowledge using language model mask prediction task. Examples of a pre-trained Seq2Seq language model include, but are not limited to, a Bidirectional Auto-Regressive Transformer (BART) or a Text-to-Text Transfer Transformer (T5), etc. In some embodiments, the barriers generation unit 340 uses an ensemble of language models.

In some embodiments, a pre-trained language model utilized by the barriers generation unit 340 is fine-tuned on domain textual data in a self-supervised manner.

In some embodiments, the system 300 includes a barriers ranking unit 350 configured to: (1) receive one or more contextually likely potential barriers (e.g., from the barriers generation unit 340), (2) determine, for each of the potential barriers, a corresponding confidence score, and (3) rank the potential barriers based on each confidence score corresponding to each potential barrier, resulting in a ranked list 250 of the potential barriers. In some embodiments, the ranked list 250 of potential barriers comprises a ranked list of potential complete sentences, wherein each sentence is originally obtained from an updated template 235 and includes a completed of filled in < . . . > field that describes a potential barrier (i.e., one of the potential barriers) that may prevent completion of a user action.

In some embodiments, a confidence score corresponding to a contextually likely potential barrier is computed using a learned probability distribution of a generative language model that the barriers generation unit 340 uses to generate the potential barriers. For example, in some embodiments, when the barriers generation unit 340 generates the potential barriers using the language model, a log likelihood of each potential barrier is maintained and later used by the barriers ranking unit 350 as a confidence score corresponding to the potential barrier.

In some embodiments, confidence score corresponding to a contextually likely potential barrier is computed using learned probability distributions of an ensemble of multiple generative language models that the barriers generation unit 340 uses to generate the potential barriers. For example, in some embodiments, when the barriers generation unit 340 generates the potential barriers using the multiple language models, a log likelihood of each potential barrier across the multiple language models is maintained and later used by the barriers ranking unit 350 as a confidence score corresponding to the potential barrier.

In some embodiments, the ranked list 250 of potential barriers is provided to a user 260 for display. In some embodiments, the system 300 allows a user 260 to provide user feedback on a ranked list 250 of potential barriers (e.g., from the barriers ranking unit 350). For example, in some embodiments, user feedback may include a quantitative evaluation of accuracy/usefulness of each potential barrier included in a ranked list 250 of potential barriers. As another example, in some embodiments, user feedback may include one or more suggestions for manually creating new templates 230 that may be used to generate potential barriers in a given context. In some embodiments, the user feedback is used to fine-tune one or more language models utilized by the barriers generation unit 340 to improve (i.e., learn and refine) future predictions of potential barriers.

The system 300 may be utilized in different domains and/or for different application uses such as, but not limited to, clinical trials, educational assessment programs, wellness programs, etc.

In the domain of clinical trials, trialists want to enroll participants and study the effect of a given intervention (e.g., a drug, a procedure, etc.). Clinical trials are very expensive to conduct, and about ninety percent of drug candidates in clinical trials fail. On average, it takes about ten to fifteen years and about 1.5 to 2.0 billion US dollars to bring a new drug to market. One of the most common reasons for clinical trial failures is the failure to recruit and retention of participants. Unexpected or unaccounted barriers are the primary reasons behind many clinical trial failures. Clinical trial failures are mainly the result of poor design which includes failing to take into account barriers that participants may face that prevent them from completing the trial. As each participant can incur costs up to 200,000 USD each year, losing participants has significant financial losses. In some embodiments, the system 300 may be utilized in clinical trials, enabling drug companies to identify and address potential barriers for recruiting and successfully studying their populations of interest (e.g., reduce drop-outs and increase participation).

The system 300 may be utilized in any simulation, system, or process where there are human obstacles preventing successful execution and completion of the simulation, system, or process. For example, the system 300 may be utilized in disaster recovery and emergency services for identifying potential barriers for populations affected by natural disasters or emergencies (e.g., individuals in certain locations may have potential barriers to evacuating their homes, such as bridges collapsing, destroyed or blocked entrances, etc.). As another example, the system 300 may be utilized in consumer market and marketing for identifying potential barriers for consumers not buying certain products (e.g., potential barriers for buying and consuming fresh foods). As another example, the system 300 may be utilized in transportation for identifying potential barriers to successfully travelling a certain itinerary (e.g., fog will delay planes, ice will require de-icing, deliveries or medical deliveries could be affected). As another example, the system 300 may be utilized in the domain of social welfare for identifying potential barriers for people who participate in social programs, collect pension, collect social benefits, etc.

Figure 4:
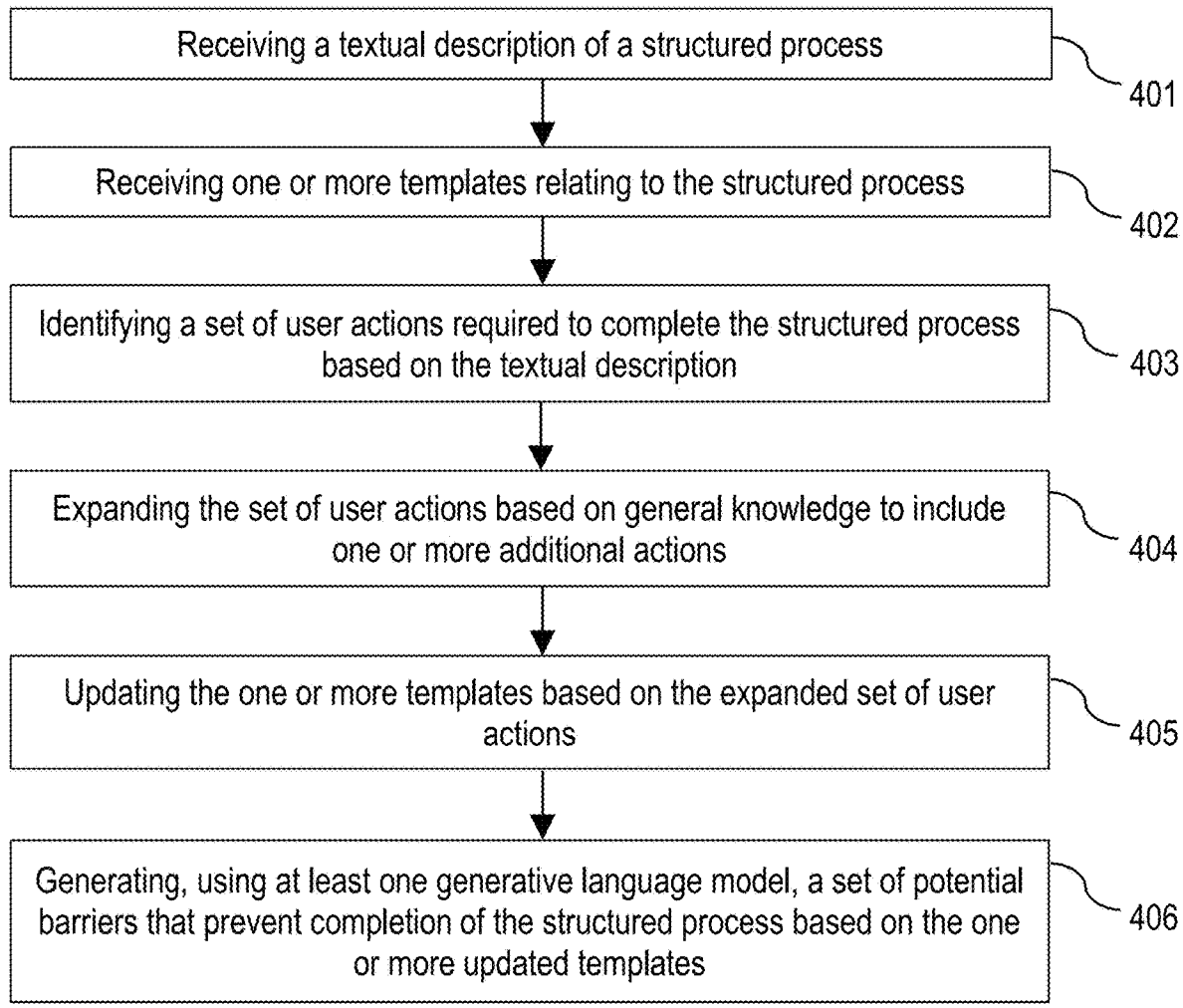
FIG. 4 is a flowchart for an example process for generating and ranking potential barriers that prevent completion of a structured process, in accordance with an embodiment of the invention.

FIG. 4 is a flowchart for an example process 400 for generating and ranking potential barriers that prevent completion of a structured process, in accordance with an embodiment of the invention. Process block 401 includes receiving a textual description of the structured process. Process block 402 includes receiving one or more templates relating to the structured process. Process block 403 includes identifying a set of user actions required to complete the structured process based on the textual description. Process block 404 includes expanding the set of user actions based on general knowledge to include one or more additional actions. Process block 405 includes updating the one or more templates based on the expanded set of user actions. Process block 406 includes generating, using at least one generative language model, a set of potential barriers that prevent completion of the structured process based on the one or more updated templates.

In some embodiments, process blocks 401-406 are performed by one or more components of the system 300.

From the above description, it can be seen that embodiments of the invention provide a system, computer program product, and method for implementing the embodiments of the invention. Embodiments of the invention further provide a computer-useable storage medium for implementing the embodiments of the invention. The computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112(f), unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating and ranking potential barriers that prevent completion of a structured process, comprising:
   receiving a textual description of the structured process;
   receiving one or more templates relating to the structured process, wherein the template comprises an explanation for why a user action required in the process could not be completed;
   identifying a set of user actions required to complete the structured process based on the textual description;
   expanding the set of user actions based on general knowledge to include one or more additional actions;
   updating the one or more templates based on the expanded set of user actions;
   generating, using at least one generative language model, a set of potential barriers that prevent completion of the structured process based on the one or more updated templates;
   fine-tuning the at least one generative language model on domain textual data and feedback on barriers in the set of potential barriers indicating that the barriers were incorrectly detected; and
   generating, using the fine-tuned generative language model, a second set of potential barriers.

2. The method of claim 1, further comprising:
   determining, for each potential barrier, a corresponding confidence score using a learned probability distribution of the at least one generative language model;
   ranking the set of potential barriers based on each confidence score corresponding to each potential barrier; and
   providing a ranked list based on the ranking as output.

3. The method of claim 2, further comprising:
   receiving user feedback on the ranked list; and
   fine-tuning the at least one generative language model based on the user feedback.

4. The method of claim 1, wherein the textual description describes the set of user actions that one or more participants enrolled or participating in the structured process are required to perform to complete the structured process.

5. The method of claim 1, wherein identifying the set of user actions based on the textual description comprises:
   applying natural language processing (NLP) to the textual description.

6. The method of claim 1, wherein the general knowledge comprises at least one of knowledge graphs and deep learning question answering and information retrieval models.

7. The method of claim 1, wherein the one or more additional user actions are required to complete the set of user actions.

8. The method of claim 1, wherein updating the one or more templates based on the expanded set of user actions comprises:
   filling in one or more fields of the one or more templates based on the expanded set of user actions.

9. A system for generating and ranking potential barriers that prevent completion of a structured process, comprising:
   at least one processor; and
   a processor-readable memory device storing instructions that when executed by the at least one processor causes the at least one processor to perform operations including:
   receiving a textual description of the structured process;
   receiving one or more templates relating to the structured process, wherein the template comprises an explanation for why a user action required in the process could not be completed;
   identifying a set of user actions required to complete the structured process based on the textual description;
   expanding the set of user actions based on general knowledge to include one or more additional actions;
   updating the one or more templates based on the expanded set of user actions;
   generating, using at least one generative language model, a set of potential barriers that prevent completion of the structured process based on the one or more updated templates;
   fine-tuning the at least one generative language model on domain textual data and feedback on barriers in the set of potential barriers indicating that the barriers were incorrectly detected; and
   generating, using the fine-tuned generative language model, a second set of potential barriers.

10. The system of claim 9, wherein the operations further include:
    determining, for each potential barrier, a corresponding confidence score using a learned probability distribution of the at least one generative language model;
    ranking the set of potential barriers based on each confidence score corresponding to each potential barrier; and
    providing a ranked list based on the ranking as output.

11. The system of claim 10, wherein the operations further include:
    receiving user feedback on the ranked list; and
    fine-tuning the at least one generative language model based on the user feedback.

12. The system of claim 9, wherein the textual description describes the set of user actions that one or more participants enrolled or participating in the structured process are required to perform to complete the structured process.

13. The system of claim 9, wherein identifying the set of user actions based on the textual description comprises:
applying natural language processing (NLP) to the textual description.

14. The system of claim 9, wherein the general knowledge comprises at least one of knowledge graphs and deep learning question answering and information retrieval models.

15. The system of claim 9, wherein the one or more additional user actions are required to complete the set of user actions.

16. The system of claim 9, wherein updating the one or more templates based on the expanded set of user actions comprises:
filling in one or more fields of the one or more templates based on the expanded set of user actions.

17. A computer program product comprising a computer readable storage medium having program instructions embodied therewith, the program instructions executable by a processor to cause the processor to:
receive a textual description of a structured process;
receive one or more templates relating to the structured process, wherein the template comprises an explanation for why a user action required in the process could not be completed;
identify a set of user actions required to complete the structured process based on the textual description;
expand the set of user actions based on general knowledge to include one or more additional actions;
update the one or more templates based on the expanded set of user actions;
generate, using at least one generative language model, a set of potential barriers that prevent completion of the structured process based on the one or more updated templates;
fine-tuning the at least one generative language model on domain textual data and feedback on barriers in the set of potential barriers indicating that the barriers were incorrectly detected; and
generate, using the fine-tuned generative language model, a second set of potential barriers.

18. The computer program product of claim 17, wherein the program instructions executable by the processor further cause the processor to:
determine, for each potential barrier, a corresponding confidence score using a learned probability distribution of the at least one generative language model;
rank the set of potential barriers based on each confidence score corresponding to each potential barrier; and
provide a ranked list based on the ranking as output.

19. The computer program product of claim 18, wherein the program instructions executable by the processor further cause the processor to:
receive user feedback on the ranked list; and
fine-tune the at least one generative language model based on the user feedback.

20. The computer program product of claim 17, wherein the textual description describes the set of user actions that one or more participants enrolled or participating in the structured process are required to perform to complete the structured process.

* * * * *